United States Patent [19]
Wyckoff

[11] Patent Number: 5,670,209
[45] Date of Patent: Sep. 23, 1997

[54] HIGH BRIGHTNESS DURABLE RETRO-REFLECTING MICROSPHERES AND METHOD OF MAKING THE SAME

[75] Inventor: Charles W. Wyckoff, Needham, Mass.

[73] Assignee: Brite-Line Technologies, Inc., Canton, Mass.

[21] Appl. No.: 589,929

[22] Filed: Jan. 23, 1996

Related U.S. Application Data

[62] Division of Ser. No. 428,801, Apr. 24, 1995, Pat. No. 5,576,097.

[51] Int. Cl.$^6$ .................. B05D 7/00; E01F 9/00; G02B 5/128

[52] U.S. Cl. .......... 427/215; 427/212; 427/226; 427/372.2; 404/10; 404/11; 404/14; 404/16; 359/541

[58] Field of Search ............... 427/212, 215, 427/226, 372.2; 404/10, 11, 14, 16; 359/541, 513, 514

[56] References Cited

U.S. PATENT DOCUMENTS

| | | | |
|---|---|---|---|
| 2,574,971 | 11/1951 | Heltzer | 106/228 |
| 3,989,775 | 11/1976 | Jack et al. | 264/1 |
| 4,957,335 | 9/1990 | Kuney, Jr. | 350/105 |

*Primary Examiner*—Shrive Beck
*Assistant Examiner*—David M. Maiorana
*Attorney, Agent, or Firm*—Weingarten, Schurgin, Gagnebin & Hayes LLP

[57] ABSTRACT

High brightness durable retro-reflecting microspheres for retro-reflection and related uses (and a novel method of forming the same) is provided embodying a retro-reflective vitreous glass microsphere encapsulated in a hardened clear non-vitreous metal-oxide ceramic shell of substantially the same index of fraction as the microsphere.

8 Claims, 1 Drawing Sheet

HIGH BRIGHTNESS DURABLE RETRO-REFLECTING MICROSPHERES AND METHOD OF MAKING THE SAME

This application is a division of parent application Ser. No. 08/428,801, filed Apr. 24, 1995 now U.S. Pat. No. 5,576,097.

BACKGROUND OF THE INVENTION

The present invention relates to vitreous glass beads or microspheres as used for enabling retro-reflection on road markers, airport runways, or signs and the like.

Most highway guidance lines, such as center lines, edge lines and lane markers, depend upon some sort of light-reflecting device for making them more visible at night when the only source of illumination is the light from motor vehicle head lamps. Such reflecting devices can be cube corners, glass microspheres, or simply light colored objects protruding above the pavement surface.

A plain white line painted on the surface or even a plain white plastic line adhered to the road surface would be barely visible even at a distance as near as 100 feet because of the extremely shallow angle of the light emanating from head lamps and impinging upon the road surface. Most of the incident light is scattered and thus reflected away from the vehicle and very little returns by reflection for the operator to detect. Use of light-reflecting devices such as the above-mentioned, incorporated with the painted or other light-colored line, can increase a motorists detection of the line out to many hundreds of feet. For example, the incorporation of transparent glass microspheres, ranging in size from a few thousandths of an inch in diameter to as much as a tenth of a inch, produce a better light reflection through an effect in which the microspheres serve as miniature optical lenses which focus the incident light from the head lamps into a tiny spot located a slight distance behind the rear surface of the microspheres. The focused spot of light falling upon a pigmented material after undergoing scattering is then partially reflected back upon itself and reaches the motorist's eyes by a phenomenon called retro-reflection. Because of light scattering by the pigmented binder in which the microspheres are partially embedded, only a small percentage of the incident light is returned by retro-reflection; but even this is considerably more light than is the case of an ordinary painted line. During daylight, the ordinary painted line is easily seen by a motorist for thousands of feet because of the abundance of ambient overhead skylight incident upon the line.

The principle of using glass microspheres as light-reflecting lenses for highway markers was first disclosed in U.S. Pat. No. 2,043,414 in 1936. Soda-lime-silicate glass, such as window glass with a refractive index of 1.5, is commonly used as the medium for the microspheres because it is relatively inactive chemically and is a very hard material. This glass, forming the microspheres, generally causes the incident light to come to a focus some distance behind the rear surface of the microsphere. An increase in the brightness can result, however, when the light comes to a focus upon the rear surface of the microsphere itself. This occurs when a glass with a higher index of refraction is used. The distance behind the rear surface of a glass microsphere where the incident light comes to a focus is a function of the refractive index of the glass. As the refractive index increases from a value of approximately 1.5, the focus point moves in closer to the rear surface of the microsphere, reaching this surface when a refractive index value of approximately 1.9 is attained. At this point, the majority of the incident light is returned back upon itself in a retro-reflected beam.

If the rear surface is covered with a highly specular light-reflecting metal such as aluminum, chromium, silver or some other specularly reflective material, then all of the incident light beam is returned except for small losses due to absorption and other minor effects, such as spherical aberration. Even without such a reflective coating, however, the returned light beam is considerably brighter than it would be with a lower refractive index glass because the scattered light in the focused spot is very near the rear surface of the sphere and thus most of it re-enters the sphere and produces a brilliant retro-reflected beam.

Unfortunately, however, 1.9 refractive index glass microspheres are generally not satisfactory for use with highway marking lines for several reasons, among which are lack of resistance to attack from atmospheric conditions, poor resistance to crushing from motor vehicle tire impacts, devitrification, color impurities, high cost, and other defects.

Resort has been attempted to harder metal-oxide ceramic "glass" or optical microspheres made by a sol-gel process disclosed in U.S. Pat. No. 4,564,556 and in which the refractive index is in the range of 1.75 to 1.76, providing a surface hardness greater than soda-lime-silicate glass. U.S. Pat. No. 4,349,456 also discloses transparent or clear non-vitreous ceramic microcapsules made by a sol-gel process using metal oxides which are hollow spheres capable of being subsequently liquid filled for the different purpose of filler material in plastic compounds. Such ceramic "glass" is also impervious to noxious atmospheric fumes such as the sulfurous emission which forms sulfuric acid in motor vehicle exhaust vapors. Although these microspheres have a higher index of refraction than the commonly used vitreous silicate glass, they are still short of the optimum brightness where the incident light focuses at the rear surface of the microsphere. According to the '556 patent, it should be possible to produce a ceramic microsphere with a refractive index of about 1.9; but there are evidently practical problems with this particular sol-gel system which so far have precluded its use for this purpose.

For the first time, in accordance with the present invention, it has been discovered how to produce the novel result of an optical microsphere with the surface hardness and density of a ceramic microsphere, but with the clarity and optimal retro-reflective brightness equivalent to a vitreous glass microsphere of approximately 1.9 refractive index, and which causes focusing at or near the rear surface of the microsphere for efficient retro-reflection.

This is achieved through a novel encapsulation of a vitreous glass microsphere with a hard, clear non-vitreous metal oxide ceramic shell.

OBJECTS OF THE INVENTION

The principal object of the present invention, therefore, is to provide a composite new and improved high brightness durable retro-reflecting glass microsphere void of the above-described prior art limitations and a novel method of making the same.

A further object is to provide a novel clear, colorless transparent hard protective coating or shell surrounding a softer vitreous glass microsphere.

An additional object is to form the protective coating as a ceramic shell.

Still a further object is to form the ceramic shell or capsule by a sol-gel process around a vitreous glass microsphere preferably with a refractive index of approximately 1.9.

A still further object is to adjust the thickness of the surrounding shell so that light incident upon the composite microsphere is caused to focus at or near the rear surface of the composite microsphere.

Other and further objects will be explained hereinafter and delineated in the appended claims.

SUMMARY OF THE INVENTION

In summary, from one of its aspects, the invention provides a method of imbuing retro-reflective vitreous glass microspheres of high refractive index with increased surface protection and hardness and without substantially impairing the retro-reflective brightness thereof, that comprises, encapsulating the vitreous glass microsphere by layering thereabout with a non-vitreous clear and high refractive index metal-oxide-derived ceramic sol-gel; controlling the encapsulating thickness and hardening the same into a clear or transparent hard ceramic shell surrounding and adhered to the microsphere, with the thickness controlled to such degree as to permit the focusing of incident light entering the front surface of the microsphere, through the adjacent portion of the hardened shell, onto or near the rear surface of the microsphere and adjacent portion of the shell, thereby to enable retro-reflection brightness substantially the same as before the encapsulation.

The novel retro-reflective composite bead structure so produced is a retro-reflective vitreous glass microsphere encapsulated in a hardend clear or transparent non-vitreous metal-oxide ceramic shell of substantially the same index of refraction as the microspheres used in a marker for roadways, airport runways, or other surfaces and the like, providing a retro-reflective element of superior durability and brightness than other commonly used similar elements. A preferred embodiment comprises a hard transparent clear ceramic shell surrounding a vitreous glass microsphere. Another embodiment provides for a transparent clear ceramic shell to surround a transparent clear vitreous lead glass microsphere whose refractive index is approximately 1.9. Light incident upon the shell is caused to enter the microsphere and come to focus upon or near its rear surface by means of adjusting the thickness of the shell in relation to its index of refraction and that of the microsphere material. In another embodiment, the ceramic shell material has the same refractive index as the core material, lessening the criticality of the thickness of the shell.

BRIEF DESCRIPTION OF THE DRAWINGS

The invention will now be described with reference to the accompanying drawings.

DESCRIPTION OF INVENTION

Figure 1:
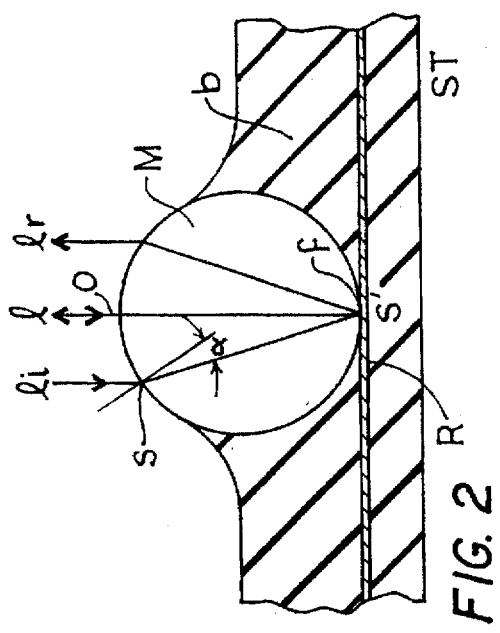
FIG. 1 of which is a sectional view of a vitreous glass microsphere with an index of refraction of 1.5, showing the relatively inefficient retro-reflection properties thereof, as before described.

Referring to FIG. 1, incident light li is shown impinging upon the microsphere M with a relatively low 1.5 index of refraction. The light enters the front surface S, where it is refracted and bent inwardly towards the perpendicular by angle α. It then reaches the rear surface at s' and is once more refracted and bent, but this time away from the perpendicular and inwardly towards the optical axis O, coming to a focus at f, some distance behind the microsphere. If the microsphere is partially imbedded in a pigmented binder b, as shown [for example, in a roadway or sign scrip ST or the like], then the light ray exiting at s' is spread with reduced brightness into a disk d on the surface of the microsphere instead of forming a bright point. After scattering by the pigmented binder, a portion of this light enters the sphere and is reflected back along the same direction from which it came and emerges as a retro-reflected ray along lr. Because of the scattering of light in the binder, however, only a portion of the incident light ray is reflected back, and the retro-reflected ray is not as bright as the incident light ray.

Figure 2:
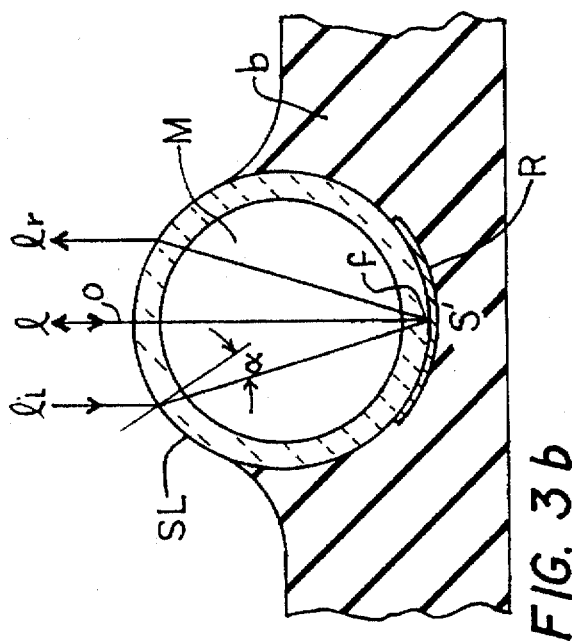
FIG. 2 is a similar view of a vitreous glass microsphere with an index of refraction of approximately 1.9, providing greater retro-reflection brightness.

Presented in FIG. 2, on the other hand, is a sectional view showing the optical light path of an incident light ray li as it enters a transparent glass microsphere M with a relatively high index of refraction of about 1.9. The light ray li enters the surface at s and is bent by angle α towards the perpendicular and optical axis o, coming to a focus f at or near the rear surface s' of the microsphere, at which point, after scattering by the pigmented binder b, most of the light re-enters the microsphere and is reflected back along the direction from which it came. It then exits the microsphere along lr but with some loss in brightness because of light scattering in the pigmented binder b. If the rear surface of the microsphere had been coated with a specular light reflecting layer R, however, such as aluminum or silver, then nearly all of the original light ray would have been returned by retro-reflection.

Figure 3A:
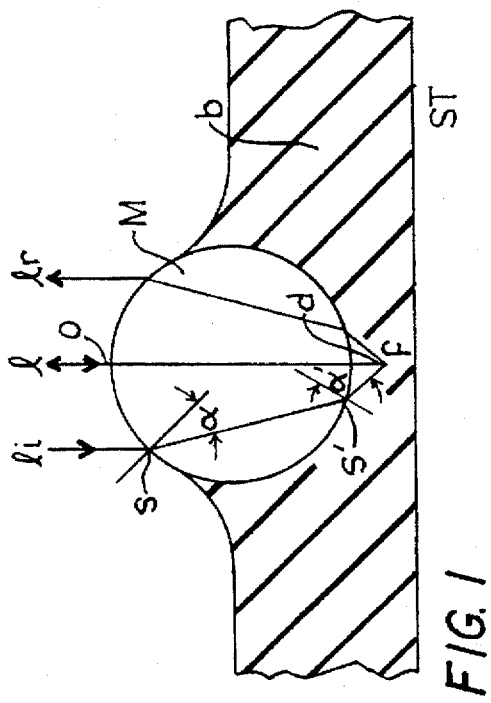
FIG. 3a is a sectional view of a composite ceramic and vitreous glass microsphere formed in accordance with the present invention, and its retro-reflection properties.

With the technique and construction of the invention, as shown in FIG. 3a, a composite microsphere is provided in which the light path of an incident light ray li enters the front portion of a ceramic outer encapsulating shell layer c with a refractive index somewhat lower than the inner vitreous glass microsphere M. The light ray is bent toward the perpendicular by angle α and then enters the inner sphere M at the front surface s and is again bent towards the perpendicular by angle α' and proceeds to exit the encapsulated inner sphere M at the lower or rear surface s'. It is then refracted by the adjacent portion of the shell SL, this time away from the perpendicular by angle α" finally coming to a focus at the rear surface of shell at f. After light scattering in the pigmented binder b, most of the light ray re-enters the shell and is retro-reflected back along the same direction from whence in came, and exits the composite microsphere along light ray lr.

Figure 3B:
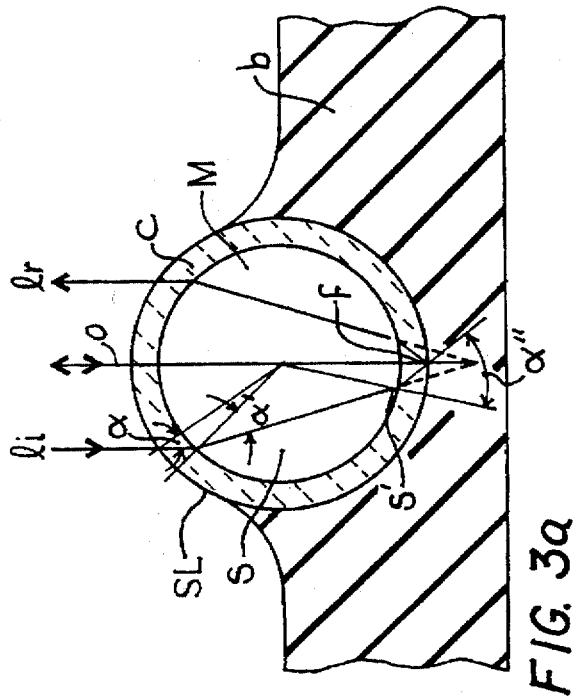
FIG. 3b is a sectional view similar to that of FIG. 3a except the shell has substantially the same refractive index as the vitreous glass microsphere in preferred form.

In FIG. 3b, however, a preferred embodiment is provided, similar to FIG. 3a, except the shell layer SL has substantially the same relatively high 1.9 refractive index as the inner sphere M. Thus the light ray li after it is bent upon entering the front surface of the shell SL passes through the shell unabated and exits into the inner sphere, again unaffected, since the shell has the same refractive index as the inner sphere. The ray comes to a focus f at the rear surface of the composite microsphere and is retro-reflected back along the same direction from whence it came, then exiting the composite microsphere at lr. It is thus clear that the composite microsphere depicted in FIG. 3b produces the same optical result as the microsphere alone of FIG. 2. Again, if coated with a reflective area R, the composite of FIG. 3b (and also FIG. 3a) will be more efficient.

Both FIGS. 3a and b embody an inner vitreous glass microsphere encapsulated by an outer hard non-vitreous metal oxide ceramic outer shell, There are several ways to accomplish this construction. U.S. Pat. No. 3,016,308 for example, discloses encapsulating a liquid with a hard but rupturable outer shell. This process requires two non-miscible emulsions. The film-forming emulsion is dropped into the second emulsion causing a film to form around the droplets of the first emulsion. Generally, the outer shell hardens and the inner droplet remains fluid. Another example is disclosed in U.S. Pat. No. 3,429,827 in which multiple shells are formed, encapsulating a core fluid. The process can be repeated to produce a thicker shell layer with more durability.

The preferred method of the instant invention, however, forms a ceramic shell layer by deposition around a glass microsphere by means of a sol-gel process. A suitable sol-gel process is described, for example, in U.S. Pat. No. 3,709,706, wherein a colloidal dispersion of a metal oxide is changed to a gel state with the components crosslinked to form a three-dimensional network. Once formed, water is extracted and then the gelled material is heated to a high temperature and is converted into a clear hard ceramic material. Vitreous glass microspheres preferably with an index of refraction of about 1.9, are immersed in such an aqueous suspension or sol of a metal oxide, such as silicon dioxide and/or zirconium dioxide, until a coating of the sol is deposited around or encapsulates the microsphere. A gelling chemical in the sol, such as ammonium acetate, causes the coating to gel after a prescribed time. The liquid is then decanted and a solution of, for example, 2-ethylhexanol is added in order to extract most of the water from the gelled coating, thus hardening the gel and preventing the coated microspheres from coalescing. The composite microspheres are then air dried, preferably at 100° C., to remove most of the remaining water. Microscope examination shows evidence of a shell coating of approximately a thousandth of an inch (mil) thickness.

When a beam of light was directed at such composite microspheres by means of an optical beam splitter, the retro-reflected beam appeared somewhat less bright than that produced when using uncoated microspheres with a refractive index of about 1.9, but was brighter than could be obtained with a 1.5 refractive index microsphere. It was theorized that the coating was not of sufficient thickness to permit the light to focus at the rear surface of the microsphere. Further testing was done in an effort to increase the thickness of the coating and this did enable such focusing and resulting brightness. The following examples are the result of this testing.

EXAMPLE 1

125 grams of 2-ethylhexanol, obtained from Shell Chemical Company, were added to a 1000 ml glass beaker and with constant stirring 0.5 gram of TERGITOL TMN®, a nonionic wetting agent from Union Carbide was added. With continued stirring, a solution of 5 grams of ammonium acetate, obtained from American International Chemical, in 100 grams of a silicon dioxide sol was added. This sol was obtained from E. I. Dupont de Nemours & Company under the name of LUDOX LS. Then, 50 grams of 0.020" (20 mil) diameter vitreous glass microspheres with an index of refraction of about 1.9 were immediately added while continuously stirring. At the end of five minutes, the liquid was drained off and the microspheres were subjected to an air stream at 100° C. for five minutes in order to drive off most of the remaining liquid. The diameter of the composite microspheres was measured at 22 mils for a shell thickness of 1 mil.

EXAMPLE 2

The length of time the microspheres remain in the sol usually determines the thickness of the deposited shell coating. The $SiO_2$ dispersion sol containing the ammonium acetate started gelling almost immediately, and at the end of about 8 minutes, was no longer usable because it had gelled completely. Thus, the resulting deposited thickness could not be increased by further prolonging the immersion time. A reduction in the amount of ammonium acetate permits more time before complete gelation occurs. An attempt was made to make multiple coatings with encouraging results. Three separate batches of $SiO_2$ sol were prepared, but the ammonium acetate was not added until just prior to adding the microspheres. After 5 minutes immersion in the first batch containing ammonium acetate, the sol was discarded and a fresh batch containing ammonium acetate was then added to the microspheres in order to deposit a second layer upon the first. A third desposit was then made in similar fashion, and finally the coated microspheres were subjected to a solution of 2-ethylhexanol and TERGITOL TMN for 5 minutes in order to expel most of the water. This solution was then discarded and the newly triple coated microspheres were air dried at 100° C. for five minutes to remove most of the remaining liquid. The microspheres had a noticeable yellow color. The composite microspheres were measured and were found to have diameters of 26 mils, which suggested a total shell thickness of 3 mils. Upon fracturing some of these composite microspheres, it was noted, by microscope, that there were 3 distinct layers, each measuring about 1 mil in thickness.

EXAMPLE 3

The procedure of EXAMPLE 2 was carried out with the exception that the composite microspheres were washed in several changes of water after drying for 5 minutes at 100° C. in order to remove any remaining residue. A considerable amount of residue was noted in the wash water. Measurements of the diameters were made, and these confirmed a shell thickness of 3 mils. The yellow color had disappeared and the retro-reflective brightness approached that of vitreous glass microspheres with a refractive index of approximately 1.9.

EXAMPLE 4

1.9 refractive index glass microspheres were treated as in EXAMPLE 3 with the exception that prior to drying, the microspheres were washed with water to remove any impurities. The water was then discarded and the composite microspheres were air dried at 100° C. for 5 minutes.

EXAMPLE 5

The composite microspheres from EXAMPLE 4 were baked for 30 minutes at 400° C. The retro-reflective brightness appeared to be equivalent to that of uncoated vitreous glass microspheres of 1.9 refractive index. These composite microspheres were then immersed in 1N sulfuric acid for 24 hours with no noticeable effect. They did not appear to be as crush resistant as normal soda-lime-silicate ($SiO_2$) glass microspheres and did fracture when hit with a hammer. However, many solid particles and shards were noted along with powder from the core glass.

EXAMPLE 6

The composite microspheres of EXAMPLE 4 were fired in a kiln at 540° C. for 30 minutes and were found to have a somewhat greater resistance to crushing. They did have a retro-reflective brightness equal to uncoated vitreous glass microspheres with a refractive index of 1.9 and were chemically resistant to the sulfuric acid treatment.

EXAMPLE 7

A mixture of a silicon dioxide and a zirconium dioxide sol was formed as follows. The zirconium was obtained from Nyacol Products, Inc. in Ashland, Mass. in the form of ZR 10/20. 21 grams of LUDOX LS sol, obtained from E. I. Dupont de Nemours and Company, was added to 250 grams of the zirconium sol and was thoroughly mixed. Next, 5 grams of the gelling agent ammonium acetate was added; and, while continuing to stir, 1000 grams of 1.9 refractive index vitreous glass beads of 80 to 120 mesh size were added. The 1000 ml glass beaker containing this mixture was then tipped at a forty five degree angle and was rotated about this axis for one hour. The liquid was then decanted and 125 grams of 2-ethylhexanol was added with continued rotation about this axis for 10 minutes. During the rotation of the beaker at this tilted axis, the microspheres were noted to be continuously rolling. The 2-ethylhexanol was decanted and the microspheres were then washed in three changes of water in order to remove residue. They were then spread on a "Teflon" tray and placed in an oven at 150° C. until they were dry, at which point the temperature was raised to 540° C. and baking was continued for one hour in order to harden up the newly formed ceramic shell. By retro-reflected light, the composite microspheres consisting of a 1.9 refractive index core and a 1.9 refractive index ceramic outer shell had a brightness equivalent so that of the control 1.9 refractive index vitreous glass microspheres. The hardness approached that of a soda-lime-silicate glass with an index of refraction of 1.5, as noted by hitting samples with a hammer.

For applications to runways and similar installations where larger diameter microspheres or beads are employed, usually of 1.9 refractive index, (such as 30–50 and 50–80 mesh), the present invention is also particularly useful, providing shell coatings with the advantages of the invention for such larger beads, also.

Further modifications will also suggest themselves in the light of the above to those skilled in the art, and such are considered to fall within the spirit and scope of the invention as defined in the appended claims.

What is claimed is:

1. A method of imbuing retro-reflective vitreous glass microspheres with increased surface protection and hardness and without substantially impairing the retro-reflective brightness thereof, that comprises, encapsulating the vitreous glass microsphere by layering thereabout with a non-vitreous clear metal-oxide-derived ceramic sol-gel; controlling the encapsulating thickness and hardening the same into a clear ceramic shell surrounding and adhered to the microsphere, with the thickness controlled to such degree as to permit the focusing of incident light entering the front surface of the microsphere, through the adjacent portion of the shell, thereby to enable retro-reflection brightness substantially the same as before the encapsulation.

2. A method as claimed in claim 1 and in which the shell thickness is controlled by controlling the length of time of layering of the sol before gelling, and then the gelled encapsulation is heat dried to harden.

3. A method as claimed in claim 2 and in which a refractive index of the glass microsphere is substantially matched to a refractive index of the ceramic shell after hardening.

4. A method as claimed in claim 1 and in which successive layering steps are performed before hardening.

5. A method as claimed in claim 4 and in which the layering is effected while rolling the microspheres.

6. A method as claimed in claim 2 and in which, after heat-drying, the encapsulated microsphere is further hardened.

7. A method as claimed in claim 3 and in which the sol-gel is a mixture of silicon and zirconium dioxide with ammonium acetate gelling agent.

8. A method as claimed in claim 7 and in which the microspheres are of diameter from about 80 to 120 mesh, and the shell is of thickness of the order of about 1–3 mils, with the said high refractive indices of the order of about 1.9.

* * * * *

UNITED STATES PATENT AND TRADEMARK OFFICE
CERTIFICATE OF CORRECTION

PATENT NO. : 5,670,209
DATED : September 23, 1997
INVENTOR(S) : Wyckoff

It is certified that error appears in the above-identified patent and that said Letters Patent is hereby corrected as shown below:

Column 4, Line 49, "whence in came" should read
-- whence it came --

Column 7, Line 31 "equivalent so that" should read
-- equivalent to that --

Signed and Sealed this

Seventeenth Day of August, 1999

Attest:

Q. TODD DICKINSON

Attesting Officer     Acting Commissioner of Patents and Trademarks